Nov. 17, 1970　　　F. THORESEN ET AL　　　3,540,203
SELF-SUPPORTING CABLES WITH FINE GRAINED POWDER
BETWEEN SUPPORT STRANDS AND EXTRUDED
JACKET AND METHOD OF MANUFACTURE
Filed March 7, 1969

Inventors
FREDRIK THORESEN
HELGE NOTEVARP

By
Attorney

United States Patent Office 3,540,203
Patented Nov. 17, 1970

3,540,203
SELF-SUPPORTING CABLES WITH FINE GRAINED POWDER BETWEEN SUPPORT STRANDS AND EXTRUDED JACKET AND METHOD OF MANUFACTURE
Fredrik Thoresen, Snaroya, and Helge Notevarp, Oslo, Norway, assignors to International Standard Electric Corporation, New York, N.Y., a corporation of Delaware
Continuation-in-part of application Ser. No. 543,607, Apr. 19, 1966. This application Mar. 7, 1969, Ser. No. 811,274
Claims priority, application Norway, Apr. 27, 1965, 157,843
Int. Cl. D02g *3/36;* H01b *7/00, 13/14*
U.S. Cl. 57—149          7 Claims

ABSTRACT OF THE DISCLOSURE

A self-supporting cable has a fine grained powder disposed about the supporting strands within an extruded thermoplastic jacket. The grains are of sufficiently small size to adhere to the strands before extrusion without added adhesive agents. The powder provides increased friction between the strands and jacket.

---

Figure 1:
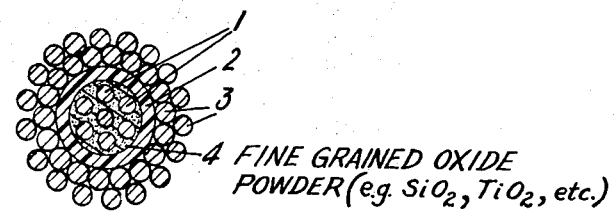

The present application is a continuation-in-part of previous application Ser. No. 543,607 filed Apr. 19, 1966, and now abandoned.

The present invention relates to a novel cable configuration and method for manufacturing self-supporting cables including support strands, and in particular a construction and method to be used in connection with extrusion of a jacket of thermoplastic material. Such support strands are preferably made of galvanized steel wires.

Several types of self-supporting cables are commonly known to be utilized in connection with the extrusion of a jacket of thermoplastic material. These include:

(1) A cable with a support stand and a thermoplastic jacket wherein a plurality of insulated conductors or conductor groups are stranded around the jacketed support strand. An outer cover is not provided, so that the support strand is easily accessible at the support points.

(2) A cable including an insulated cable core comprising a plurality of conductors or conductor groups, wherein the supporting strand is arranged as a layer of wires which are stranded around the cable core. Thermoplastic material is extruded over the supporting wire layer so as to provide a jacket for these wires.

(3) A cable including a cable core and a support strand arranged in parallel to each other and both covered by a common thermoplastic jacket, and joined by a relatively thin web, i.e. the so-called "figure 8" cable.

It is common for these three types of self-supporting cables to be supported at the poles by using clamps which are designed to grip the jacketed support strand. The thermoplastic jacket may be extruded by means of pressure extrusion or it may be extruded by use of the so-called "vacuum-technique." The object of the jacket is in all cases to provide corrosion protection for the support strand. An additional object of the jacket is to support the cable core in the "figure 8" cable. The type of thermoplastic material used is usually polyvinylchloride or polyethylene.

When self-supporting cables are installed as mentioned, by gripping the jacketed support strand with clamps and supporting the clamps at the poles, the jacketed support strand is subjected to a considerable longitudinal tension and it is therefore essential that the friction between the jacket and the support strand is high. If this friction is smaller than the friction between the clamp and the jacket, the support strand may slide within its jacket, with the result that the jacket is damaged or torn.

Most conventional self-supporting cables have this disadvantage. There are therefore many methods suggested for increasing the friction between the support strand and the jacket. One method is to use high extrusion pressure in order to obtain better contact between the support strand and its jacket. Another suggestion is to clean the strands thoroughly before the extrusion process in order to remove any oil or contaminations. A further suggestion is to apply glue or other added adhesive agents between the support strand and its jacket.

None of these methods has, however, given satisfactory results.

A satisfactory result may obviously be obtained if the support strands are provided with a very rough surface. In this case it has been suggested to use a combination of relatively large friction particles such as emery, sand or the like and added adhesive agents such as paste for providing a rough support strand surface.

This method has, however, the severe disadvantage that the jacket extruding tool will be excessively worn when the rough support strand is passed through the extrusion tools. This method is therefore not considered to be practical.

The main object of the present invention is to provide a cable configuration and method for manufacturing self-supporting cables where the friction between the support strand and its jacket is very high and where the above mentioned problems are overcome.

The main feature of the present invention is that a fine grained powder, containing particles in the order of 0.01 to 10 microns, is applied to or deposited on the support strand before the extrusion process, so that the friction between the support strand and its jacket is considerably increased. When a fine grained powder thus is deposited between the support strand and its jacket, the friction is increased five to seven times, and when supporting clamps are used to grip the jacketed support strand, the support stand will not slide within its jacket. The cables may, therefore, be effectively tightened and supported from poles. This fine grained powder is self-adherent and is not used in connection with additional adhesive agents and it will not cause excessive wear of the extrusion tool.

Figure 2:
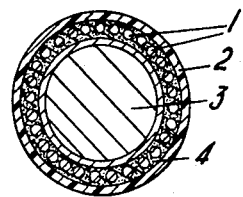
Figure 3:
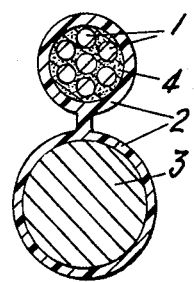

FIGS. 1, 2 and 3 show cross-sections of the above mentioned three types of self-supporting cables, with the same designations used in all figures.

A support strand 1, which is provided with a thermoplastic jacket 2, is used to support a plurality of conductors or groups of conductors 3. The fine grained powder 4 is deposited on the strands to adhere thereto before the extrusion process. This powder also fills the space between strand and jacket.

The powder should preferably be made from amorphous non-crystalline material between .01 to 10 microns and the mean particle size should preferably be about 0.1 micron, which permits the particles to adhere to the strand and jacket by means of inherent intermolecular force, without added adhesive or bonding agents. Experiments have shown that very good results may be obtained when the fine grained powder is chosen from the oxides of the elements in Groups III to VI in the Periodic System. Finely distributed silicon dioxide and titanium dioxide are particularly advantageous when these oxides re produced by means of pyrolysis.

In FIG. 1 the conductors are stranded around the support strand and are thus supported by the strand. The support strand is accessible when the conductors are parted slightly. Clamps (not shown) are then used to grip the support strand.

In FIG. 2 the support strand is arranged as a layer of wires which are stranded around the cable core. This cable may be supported by using supporting clamps (not shown) for gripping the whole cable.

FIG. 3 shows a "figure 8" cable utilizing the same powder filling about the support strands.

The powder may be applied by passing the support strand through a pan or bin containing the fine grains. The powder is stirred continuously to prevent clogging and superfluous powder is wiped off the strand upon leaving the bin so that a relatively thin layer covers the strand when it enters the extruder. The power should not be so thick that slip occurs within the layer.

The above detailed description of the invention with regard to manufacture of these particular types of self-support cables should be no way be considered as a limitation of the scope of the invention as set forth in the appended claims.

What is claimed is:

1. A method for manufacturing self-supporting cables including support strands having a jacket of extrudable material, comprising applying a fine grained powder having particles of a size in the range of 0.01 to 10 microns about the support strands to adhere thereto without the presence of any added adhesive material therebetween before the extrusion process, and extruding the jacket around the strands and powder, said powder thereafter providing increased friction between the support strands and jacket.

2. A method according to claim 1 wherein the fine grained powder is made of amorphous material and the mean particle size is about 0.1 micron.

3. A method according to claim 1 wherein the fine grained powder is of a non-crystalline material selected from the group consisting of oxides of the elements in Groups III to VI of the Periodic System.

4. A method according to claim 3 including producing said oxides by pyrolysis, said oxides being selected from the group consisting of silicon dioxide and titanium dioxide.

5. A cable comprising support strands, a jacket of extrudable thermoplastic material disposed around said strands and a fine grained powder having particles of a size in the range of .01 to 10 microns disposed about the support strands beneath said jacket to be self-adherent to said strands and jacket in the complete absence of any added adhesive material and provide friction therebetween.

6. The cable of claim 5 wherein the powder has a mean particle size of about 0.1 micron and is an amorphous material selected from the group consisting of oxides of the elements in Groups III to VI of the Periodic System.

7. The cable of claim 6 wherein said oxides are selected from the group consisting of silicon dioxide and titanium dioxide.

References Cited

UNITED STATES PATENTS

| | | | |
|---|---|---|---|
| 2,386,634 | 10/1945 | Robinson | 204—181 |
| 2,567,162 | 9/1951 | Sanders | 117—218 |
| 3,197,593 | 7/1965 | Lange et al. | 117—231 |
| 3,267,201 | 8/1966 | Pasey et al. | 174—41 |

FOREIGN PATENTS

| | | |
|---|---|---|
| 1,106,381 | 5/1961 | Germany. |

LARAMIE E. ASKIN, Primary Examiner

U.S. Cl. X.R.

57—162; 117—26, 218, 231; 174—70, 110; 264—131, 174